United States Patent [19]
Baker et al.

[11] Patent Number: 5,853,194
[45] Date of Patent: Dec. 29, 1998

[54] COLLAPSIBLE STEERING SHAFT ASSEMBLY

[75] Inventors: Frederick L. Baker; Phillip S. Peterson; Timothy M. Lowney, all of Lafayette; Richard J. Eckhart, Buck Creek, all of Ind.

[73] Assignee: TRW Inc., Lyndhurst, Ohio

[21] Appl. No.: 854,857

[22] Filed: May 12, 1997

[51] Int. Cl.⁶ .................................................. B62D 1/11
[52] U.S. Cl. ............................................. 280/777; 74/492
[58] Field of Search .................................. 280/777, 780; 74/492, 493

[56] References Cited

U.S. PATENT DOCUMENTS

| | | |
|---|---|---|
| 3,797,601 | 3/1974 | Barenyi et al. . |
| 3,827,710 | 8/1974 | Connell et al. . |
| 3,934,897 | 1/1976 | Moos ........................................ 280/777 |
| 3,960,031 | 6/1976 | Chometon et al. . |
| 4,531,760 | 7/1985 | Patzelt ...................................... 280/777 |
| 4,892,002 | 1/1990 | Groat . |
| 4,946,195 | 8/1990 | Ioka et al. . |
| 5,067,747 | 11/1991 | Yokoyama . |
| 5,074,161 | 12/1991 | Hancock . |
| 5,141,248 | 8/1992 | Haldric et al. ........................... 280/777 |

FOREIGN PATENT DOCUMENTS

| 176776 | 7/1988 | Japan ...................................... 280/777 |
|---|---|---|

*Primary Examiner*—Christopher P. Ellis
*Attorney, Agent, or Firm*—Tarolli, Sundheim, Covell, Tummino & Szabo

[57] ABSTRACT

A steering shaft (32) has a stress riser (70) which is inelastically deformable under stress induced by a predetermined vehicle crash force so as to initiate inelastic deflection of the shaft (32) under the crash force.

9 Claims, 2 Drawing Sheets

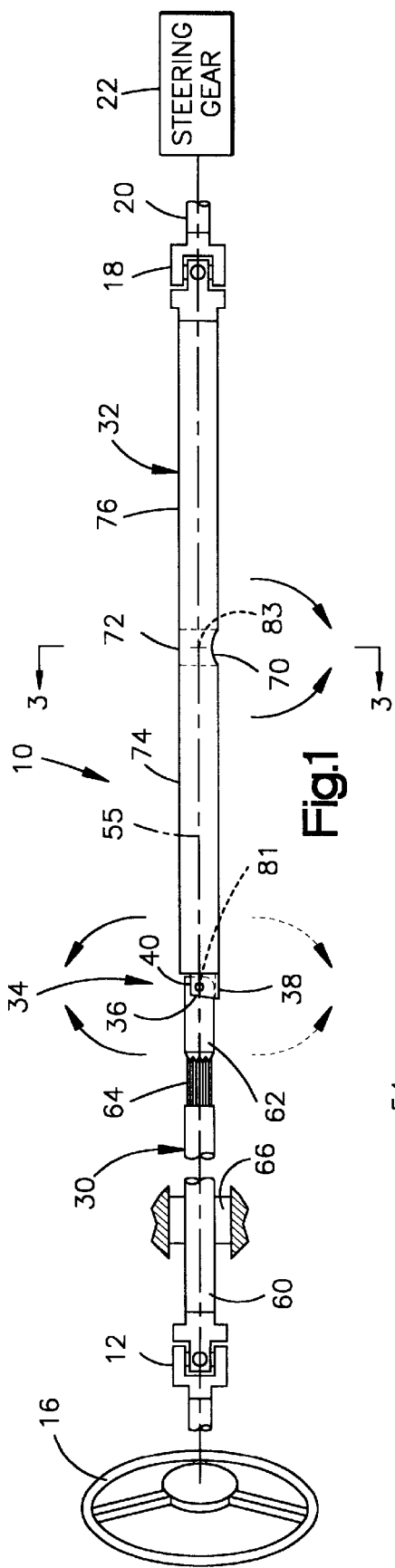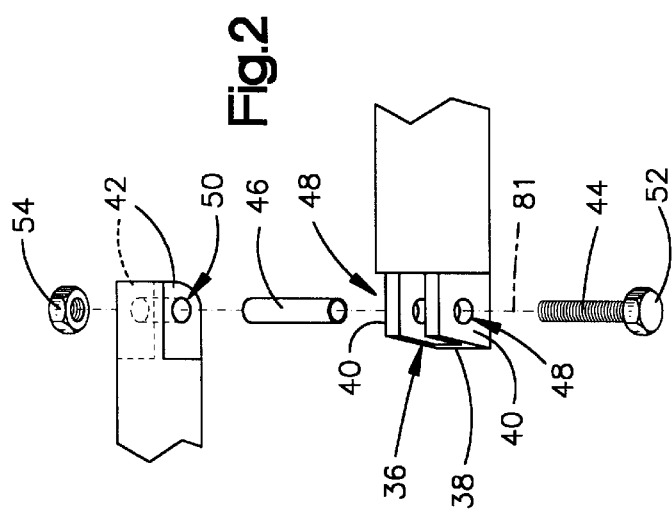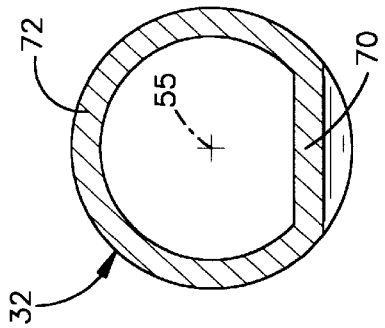

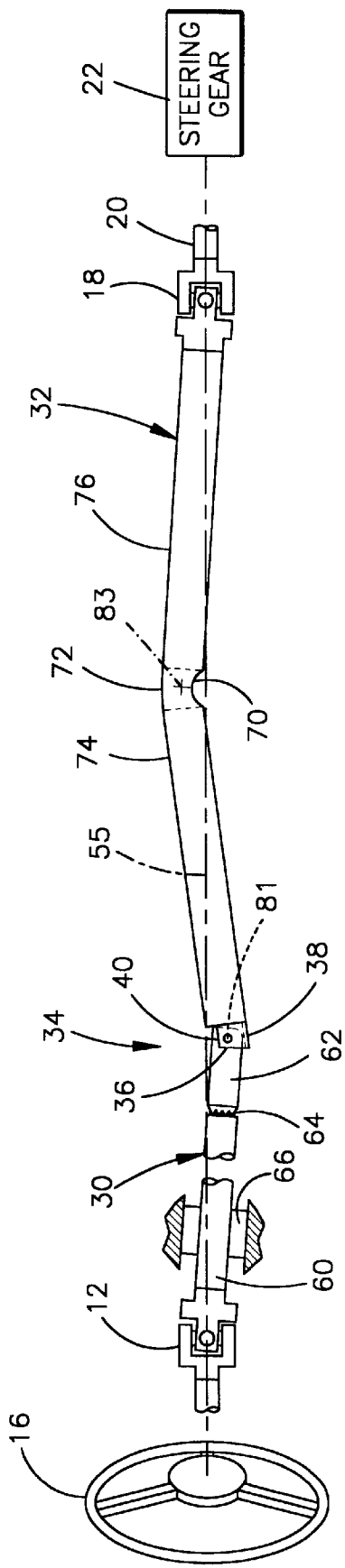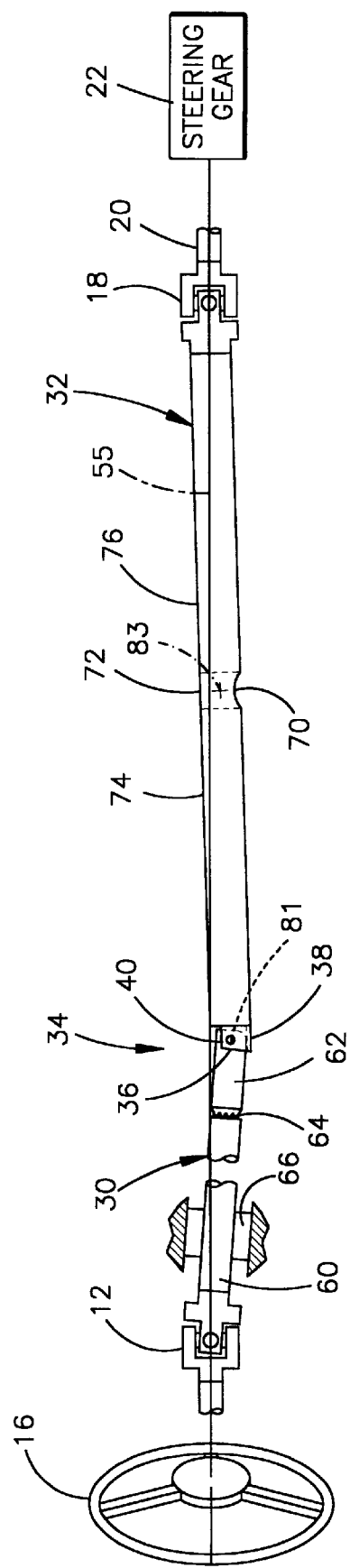

COLLAPSIBLE STEERING SHAFT ASSEMBLY

FIELD OF THE INVENTION

The present invention relates to an assembly of steering shafts in a vehicle steering column, and particularly relates to an assembly of steering shafts which is collapsible under the force of a vehicle crash.

BACKGROUND OF THE INVENTION

A vehicle steering column m ay include an assembly of steering shafts extending between the steering wheel and the vehicle steering gear. The steering shafts are interconnected by torque transmitting joint s so as to rotate together, and thereby to transmit steering torque between the steering wheel and the steering gear.

When the vehicle experiences a frontal collision, crash forces are transmitted to the steering shaft assembly from the steering gear or other parts of the vehicle. Therefore, a steering shaft assembly normally includes a torque transmitting joint that yields longitudinally under a predetermined vehicle crash force. This enables the steering shaft assembly to collapse so that excessive crash forces are not transmitted longitudinally through the shaft assembly from the steering gear to the steering wheel. As known in the prior art, such yieldable joints include pivotal hinges, telescopically slidable cylinders, and/or disengageable fasteners.

SUMMARY OF THE INVENTION

In accordance with the present invention, a torque transmitting steering shaft has a stress riser. The stress riser is inelastically deformable under stress induced by a predetermined vehicle crash force so as to initiate inelastic deflection of the shaft under the crash force.

In a preferred embodiment of the present invention, the stress riser is a portion of a bendable joint. The bendable joint interconnects two adjacent sections of the steering shaft for relative pivotal movement upon inelastic bending of the joint as a result of inelastic deformation of the stress riser. The stress riser is preferably constructed as a radially indented tubular wall portion of the shaft.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a view of an apparatus comprising a preferred embodiment of the present invention;

FIG. 2 is an enlarged, exploded view of parts of the apparatus of FIG. 1;

FIG. 3 is a view taken on line 3—3 of FIG. 1; and

FIG. 4 is a view similar to FIG. 1 showing parts in different positions.

FIG. 5 is also a view similar to FIG. 1 illustrating different positions.

DESCRIPTION OF A PREFERRED EMBODIMENT

An apparatus 10 comprising a preferred embodiment of the present invention is shown in FIG. 1. The apparatus 10 is an assembly of steering shafts which rotate together to transmit steering torque in a vehicle steering column.

An upper universal joint 12 connects the upper end of the shaft assembly 10 to a vehicle steering wheel 16 (shown schematically) in a known manner. A lower universal joint 18 connects the lower end of the shaft assembly 10 directly to the input shaft 20 on a steering gear 22 (also shown schematically). The steering gear 22 steers a pair of vehicle wheels in response to rotation of the input shaft 20, and may comprise any suitable structure known in the art.

In the preferred embodiment of the present invention, the shaft assembly 10 includes first and second shafts 30 and 32. The shafts 30 and 32 are interconnected by a torque transmitting hinge joint 34. As best shown in FIG. 2, the hinge joint 34 includes a collar 36 which is fixed to the upper end of the second shaft 32. The collar 36 has a U-shaped configuration defined by a base wall 38 and a pair of opposite side walls 40. The first shaft 30 has a pair of diametrically opposed flats 42 at its lower end. The flats 42 are received within the collar 36, and fit closely against the side walls 40 of the collar 36.

A threaded rod 44 and a surrounding sleeve 46 are received through aligned apertures 48 and 50 in the collar 36 and the first shaft 30. The rod 44 and the sleeve 46 are held in place by a head 52 on one end of the rod 44 and a nut 54 received on the other end of the rod 44. The rod 44 and the sleeve 46 together define a bearing which supports the first and second shafts 30 and 32 for pivotal movement relative to each other in directions indicated by the arrows shown in solid lines in FIG. 1. The base wall 38 of the collar 36 blocks the shafts 30 and 32 from pivoting oppositely in the directions indicated by the arrows shown in dashed lines in FIG. 1. Moreover, the nut 54 is tightened onto the rod 44 sufficiently to clamp the side walls 40 of the collar 36 against the flats 42 tightly enough to resist relative pivotal movement of the shafts 30 and 32 during ordinary operating conditions of the vehicle. The shafts 30 and 32 are thus maintained in positions centered on a common axis 55 so as to transmit steering torque along the axis 55.

As further shown in FIG. 1, the first shaft 30 has upper and lower sections 60 and 62. The upper section 60 is an internally splined sleeve. An externally splined portion 64 of the lower section 62 extends longitudinally into the sleeve 60. The splined connection of the upper and lower sections 60 and 62 enables the first shaft 30 to transmit steering torque between the upper universal joint 12 and the second shaft 32, and also enables the length of the first shaft 30 to vary upon longitudinal movement of the lower section 62 telescopically within the upper section 60. As known in the art, such telescopic movement may occur intermittently as vibrations and other vehicle operating movements are imparted to the shaft assembly 10 by the steering gear 22 or other parts of the vehicle. A bracket 66 or other suitable part of the vehicle engages the upper section 60 to restrain movement of the upper section 60 along the axis 55.

The second shaft 32 is a unitary, cylindrical tubular structure extending fully from the hinge joint 34 to the lower universal joint 18. A small tubular wall portion 70 of the second shaft 32 is indented radially inward. The indented wall portion 70 preferably extends only a short distance along the length of the second shaft 32, as shown in FIG. 1, and preferably extends only partially around the periphery of the second shaft 32, as shown in FIG. 3. Accordingly, the indented wall portion 70 is included within a short cylindrical section 72 of the second shaft 32.

The indented wall portion 70 weakens the second shaft 32 by reducing its bending strength at the short cylindrical section 72. More specifically, the indented wall portion 70 is a stress riser which initiates inelastic bending of the second shaft 32 at the short cylindrical section 72 under the influence of vehicle crash forces. The short cylindrical section 72 thus comprises a bendable joint which interconnects two elongated cylindrical sections 74 and 76 for pivotal movement relative to each other upon inelastic bending the second shaft 32 at the joint 72, as indicated by the corresponding arrows shown in solid lines in FIG. 1.

When the vehicle experiences a crash, and especially when the vehicle experiences a frontal collision, crash forces are transmitted to the shaft assembly 10 from the steering gear 22. Such crash forces may have longitudinally directed components that are great enough to collapse the first shaft 30 to the shortest length permitted by telescopic movement of the lower section 62 into the upper section 60. In some cases, crash forces may continue to act against the shaft assembly 10 after the first shaft 30 is fully collapsed. Such sustained crash forces induce stresses which become concentrated at the stress riser 70 in the bendable joint 72. If such a sustained crash force meets or exceeds a predetermined level, the resulting stresses will exceed the elastic limit of the stress riser 70. This will cause the stress riser 70 to deform inelastically, and thereby to initiate inelastic bending of the second shaft 32 at the bendable joint 72, as shown in FIG. 4.

When the second shaft 32 bends in the foregoing manner, the relative pivotal movements of the shaft sections 74 and 76 at the bendable joint 72 initiate corresponding relative pivotal movements of the shaft sections 62 and 74 at the hinge joint 34, as further shown in FIG. 4. This collapses the shaft assembly longitudinally to prevent the shaft assembly 10 from transmitting the sustained crash forces to the steering wheel 16 in amounts that could injure the driver of the vehicle.

In accordance with a particular feature of the present invention, the stress riser 70 at the bendable joint 72 is most preferably located circumferentially adjacent to the base wall 38 of the collar 36 at hinge joint 34. In this arrangement, the pivotal axes 81 and 83 at the joints 34 and 72 are parallel, and the joints 34 and 72 enable pivotal movement of their corresponding shaft sections in respectively opposite directions (as indicated by the solid arrows). This promotes collapsing of the shaft assembly 10 as pivotal movement of the shaft section 74 at the bendable joint 72 complements pivotal movement of the same shaft section 74 at the hinge joint 34. As a result, the shaft assembly 10 collapses quickly and efficiently under the influence of vehicle crash forces at or above the predetermined level.

In accordance with another particular feature of the present invention, the hinge joint 34 may yield before the bendable joint 72. The second shaft 32 then becomes skewed relative to the axis 55, as shown in FIG. 5, before it bends. Crash forces which are then transmitted along the axis 55 from the steering gear 22 to the skewed shaft 32 will induce bending stresses that are substantially greater than the bending stresses similarly induced in the axially aligned shaft 32 of FIG. 1. This helps to promote bending of the shaft 32 at the bendable joint 72.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

first and second steering shafts; and a torque transmitting hinge joint pivotally connecting said first shaft directly with said second shaft and blocking pivotal movement between said first and second shafts in first directions relative to each other when said first and second shafts are in first positions;

said second shaft including a pair of relatively pivotal shaft sections which are interconnected by a bendable joint, said bendable joint comprising a stress riser which is inelastically deformable under stress induced by a predetermined vehicle crash force so as to initiate inelastic bending of said second shaft at said bendable joint.

2. Apparatus as defined in claim 1 wherein said bendable joint and said hinge joint have parallel pivotal axes.

3. Apparatus as defined in claim 1 wherein said hinge joint normally maintains said first and second shafts in positions centered on a common axis.

4. Apparatus as defined in claim 1 further comprising a universal joint connecting said second shaft directly with an input shaft on a vehicle steering gear, said second shaft being a unitary structure extending fully from said hinge joint to said universal joint.

5. Apparatus as defined in claim 1 wherein said stress riser is a radially indented tubular wall portion of said second shaft.

6. Apparatus as defined in claim 5 wherein said radially indented tubular wall portion extends only partially around the periphery of said second shaft.

7. Apparatus as defined in claim 1 wherein said hinge joint enables pivoting of said first and second shafts relative to each other in response to a second predetermined vehicle crash force less than said predetermined vehicle crash force which induces stress so as to initiate inelastic bending of said second shaft at said bendable joint.

8. Apparatus as defined in claim 1 wherein said first shaft includes first and second coaxial sections axially movable relative to each other, said first section being pivotally connected to said second shaft by said hinge joint.

9. Apparatus as defined in claim 7 wherein said first shaft includes first and second coaxial sections axially movable relative to each other, said first section being pivotally connected to said second shaft by said hinge joint.

* * * * *